(12) United States Patent
Ninomiya

(10) Patent No.: US 10,996,977 B2
(45) Date of Patent: May 4, 2021

(54) INFORMATION PROCESSING APPARATUS AND PROCESS MANAGEMENT METHOD THAT CONTROL A NUMBER OF PROCESSES EXECUTED IN PARALLEL

(71) Applicant: FUJITSU LIMITED, Kanagawa (JP)

(72) Inventor: Atsushi Ninomiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 16/107,336

(22) Filed: Aug. 21, 2018

(65) Prior Publication Data

US 2019/0065239 A1 Feb. 28, 2019

(30) Foreign Application Priority Data

Aug. 24, 2017 (JP) .............................. JP2017-161226

(51) Int. Cl.
*G06F 9/48* (2006.01)
*G06F 12/02* (2006.01)
*G06F 9/50* (2006.01)
*G06F 12/08* (2016.01)
*G06F 11/34* (2006.01)

(52) U.S. Cl.
CPC ............ *G06F 9/485* (2013.01); *G06F 9/4881* (2013.01); *G06F 9/5016* (2013.01); *G06F 9/5038* (2013.01); *G06F 11/34* (2013.01); *G06F 12/0253* (2013.01); *G06F 12/08* (2013.01); *G06F 2212/1016* (2013.01); *G06F 2212/1044* (2013.01); *G06F 2212/502* (2013.01)

(58) Field of Classification Search
None
See application file for complete search history.

(56) References Cited

U.S. PATENT DOCUMENTS

| 5,517,643 A * | 5/1996 | Davy ..................... G06F 9/5016 |
| | | 711/173 |
| 9,069,669 B2 * | 6/2015 | Li ........................ G06F 9/45558 |
| 9,116,631 B2 * | 8/2015 | Choi ....................... G06F 12/12 |

(Continued)

FOREIGN PATENT DOCUMENTS

| JP | 59-207479 | 11/1984 |
| JP | 02-053150 | 2/1990 |

OTHER PUBLICATIONS

Park et al. "Management of Virtual Memory Systems under High Performance PCM-based Swap Devices,"2015 IEEE, pp. 764-777.*

*Primary Examiner* — Van H Nguyen
(74) *Attorney, Agent, or Firm* — Fujitsu Patent Center

(57) ABSTRACT

An information processing apparatus includes a processor, a memory, and a storage device. The processor includes a plurality of sub-processors. The memory stores data of part of pages included in an address space allocated to processes executable in parallel using the plurality of sub-processors. The storage device retreats data of pages that are not stored in the memory. The processor acquires a working set size for each of the processes. The working set size indicates an amount of pages used for a unit time. The processor selects part of the processes when a sum of working set sizes of the processes exceeds a predetermined threshold value. The processor stops the selected processes for a predetermined time. The processor controls data of pages corresponding to the processes being stopped to be retreated from the memory to the storage device.

10 Claims, 13 Drawing Sheets

(56) References Cited

U.S. PATENT DOCUMENTS

| | | | |
|---|---|---|---|
| 9,489,295 B2* | 11/2016 | Okamoto | G06F 12/023 |
| 9,507,657 B2* | 11/2016 | Niwa | G06F 11/0778 |
| 10,310,893 B2* | 6/2019 | Bak | G06F 9/485 |
| 2016/0041769 A1* | 2/2016 | Takahashi | G06F 12/0862 |
| | | | 711/159 |
| 2017/0286153 A1* | 10/2017 | Bak | G06F 9/542 |

* cited by examiner

FIG. 4

PROCESS INFORMATION TABLE  127

| PROCESS ID | STATE | SWAP TIME | WORKING SET |
|---|---|---|---|
| A | RUN | 0Δt | 6.0 GiB |
| B | RUN | 0Δt | 1.0 GiB |
| C | SWAP | 1Δt | 3.0 GiB |
| ... | ... | ... | ... |

FIG. 12

PROCESS INFORMATION TABLE ~128

| PROCESS ID (a) | PRIORITY (b) | STATE (c) | EXECUTION COUNT (d) | REMAINING SCHEDULED COUNT (e) | CONTINUOUS EXECUTION COUNT (f) | WS CURRENT VALUE (g) | WS MAXIMUM VALUE (h) | WS CHANGE AMOUNT (i) | EVALUATION VALUE (j) |
|---|---|---|---|---|---|---|---|---|---|
| A | 5 | RUN | 15 COUNT | 4 COUNT | 5 COUNT | 5.0 GiB | 5.5 GiB | 0 GiB | 33 |
| B | 5 | RUN | 2 COUNT | 98 COUNT | 2 COUNT | 2.3 GiB | 2.3 GiB | +0.2 GiB | 7 |
| C | 8 | SWAP | 40 COUNT | 20 COUNT | 10 COUNT | 2.3 GiB | 3.0 GiB | -0.5 GiB | 15 |
| : | : | : | : | : | : | : | : | : | : |

INFORMATION PROCESSING APPARATUS AND PROCESS MANAGEMENT METHOD THAT CONTROL A NUMBER OF PROCESSES EXECUTED IN PARALLEL

CROSS-REFERENCE TO RELATED APPLICATION

This application is based upon and claims the benefit of priority of the prior Japanese Patent Application No. 2017-161226, filed on Aug. 24, 2017, the entire contents of which are incorporated herein by reference.

FIELD

The embodiments discussed herein are related to an information processing apparatus and a process management method.

BACKGROUND

In an information processing apparatus which includes a memory as a main memory such as a random access memory (RAM) and a storage device as an auxiliary memory such as a hard disk drive (HDD), in many cases, a virtual storage is used in a method of utilizing a storage area with a limited memory. In the virtual storage, a virtual address space larger than a physical storage area is allocated to a process executed by a processor such as a central processing unit (CPU). In the virtual storage, in many cases, a paging method may be used in which an address space is divided into pages with fixed lengths to be managed.

For processes that are being executed, some pages among a plurality of pages included in an address space may be arranged in a memory, and other pages may be arranged in a storage device. When pages for which a process desires to use are not arranged in the memory, a page fault occurs. When the page fault occurs, a process called a page-out is performed in which some pages arranged in the memory are retreated to the storage device, and a process called a page-in is performed in which desired pages are restored from the storage device to an empty area of the memory generated by the page-out.

In a page replacement algorithm of selecting pages to be subjected to page-out, a working set of each process may be taken into consideration. The working set is a set of pages that have been used by a corresponding process for a unit time in an address space allocated to certain processes, and may be said to be, for example, a set of recently used pages or a set of pages that are being used. When a process uses a wide range of data, the working set size increases, and when the process repeatedly uses a narrow range of data, the working set size decreases. In the page replacement algorithm, due to a locality that the same pages are likely to be repeatedly used in the short term, pages not belonging to a working set may be preferentially subjected to page-out.

A main memory control system has been suggested in which a window size, which is a cycle at which a working set of each process is determined, is set to be longer when an empty area of a memory is large, and the window size is set to be shorter when the empty area of the memory is small. A memory allocation amount survey system has been suggested to investigate how the memory allocation amount of each process changes when a page size is changed.

Related technologies are disclosed in, for example, Japanese Laid-Open Patent Publication Nos. 59-207479 and 02-053150.

SUMMARY

According to an aspect of the present invention, provided is an information processing apparatus including a processor, a memory coupled to the processor, and a storage device coupled to the processor. The processor includes a plurality of sub-processors. The memory is configured to store data of part of pages included in an address space allocated to processes executable in parallel using the plurality of sub-processors. The storage device is configured to retreat data of pages that are not stored in the memory. The processor is configured to acquire a working set size for each of the processes. The working set size indicates an amount of pages used for a unit time. The processor is configured to select part of the processes when a sum of working set sizes of the processes exceeds a predetermined threshold value. The processor is configured to stop the selected processes for a predetermined time. The processor is configured to control data of pages corresponding to the processes being stopped to be retreated from the memory to the storage device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a view illustrating an example of a process information table in the second embodiment;

FIG. 12 is a view illustrating an example of a process information table in the third embodiment.

DESCRIPTION OF EMBODIMENTS

In recent years, an information processing apparatus often includes a plurality of processors such as a plurality of CPUs or a plurality of CPU cores, and thus, it becomes possible to simultaneously execute a plurality of processes. When there are a plurality of simultaneously executable processes, in many cases, a scheduling may be performed by utilizing the plurality of processors included in the information processing apparatus so as to increase the degree of parallelism as much as possible.

However, when the number of processes executed in parallel is increased according to the number of processors, a storage area of a memory shared by the plurality of processors may become insufficient, and thus, a slashing may occur in which a process called page-out and a process called page-in are frequently repeated. Accordingly, memory access may become a bottleneck, which in turn may lower the efficiency of execution of the process.

Hereinafter, the present embodiment will be described with reference to the accompanying drawings.

First Embodiment

A first embodiment will be described.

Figure 1:
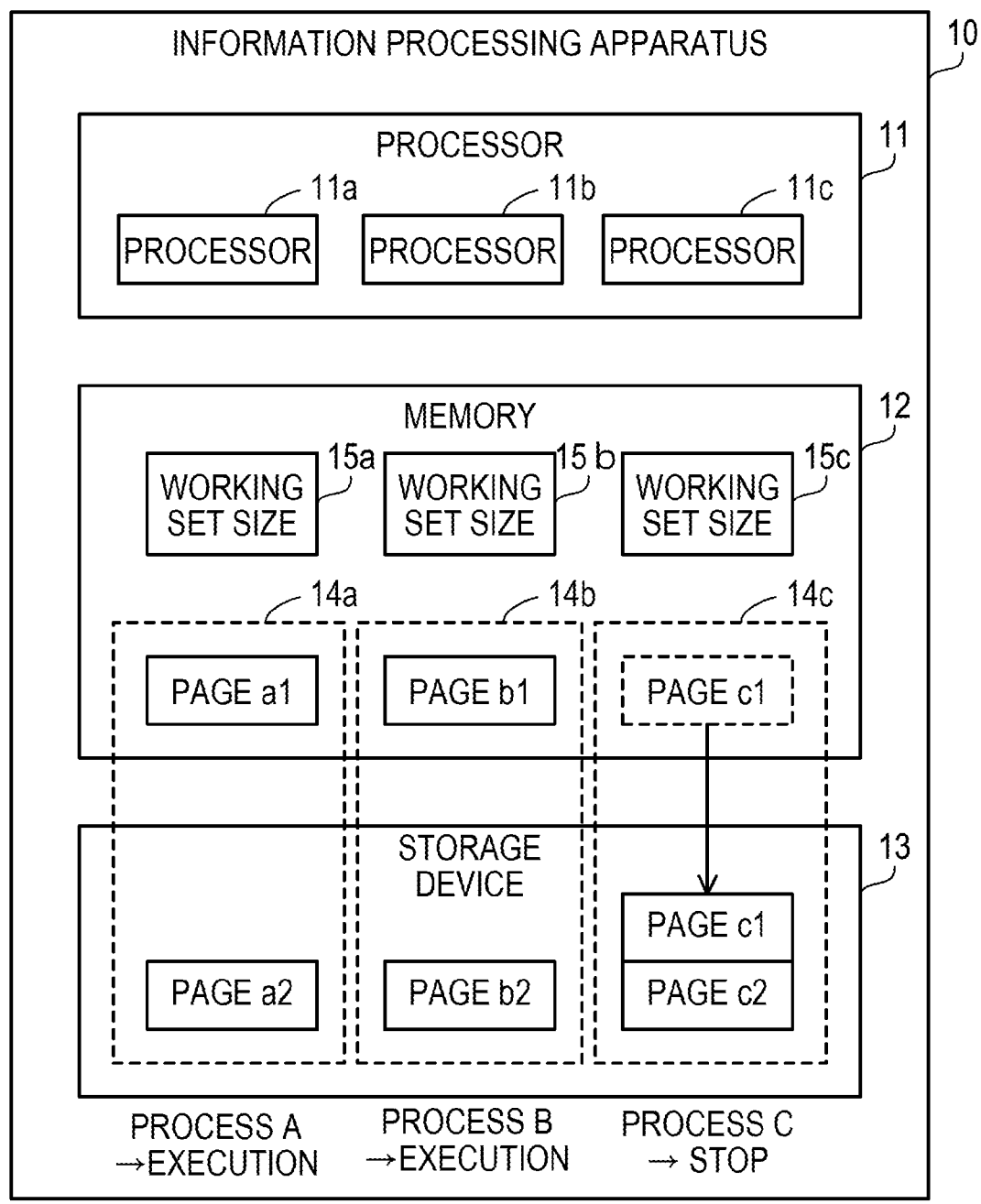
FIG. 1 is a view illustrating an information processing apparatus according to a first embodiment.

FIG. 1 is a view illustrating an information processing apparatus according to the first embodiment.

An information processing apparatus 10 according to the first embodiment is a computer capable of simultaneously executing a plurality of processes by using a plurality of processors. The information processing apparatus 10 may be a client computer or a server computer.

The information processing apparatus 10 includes a processor 11, a memory 12, and a storage device 13. The processor 11 includes a plurality of processors including processors 11a, 11b, and 11c. The plurality of processors are, for example, a plurality of CPUs or a plurality of CPU cores. Meanwhile, the processor 11 may include other electronic circuits such as a digital signal processor (DSP), an application specific integrated circuit (ASIC), and a field programmable gate array (FPGA). The memory 12 is a shared memory used by the plurality of processors included in the processor 11, and may be used as a main memory device. The memory 12 is, for example, a volatile semiconductor memory such as a RAM. The storage device 13 is a memory device other than the memory 12, and may be used as an auxiliary memory device. The storage device 13 is, for example, a non-volatile storage device such as an HDD or a solid state drive (SSD).

In the information processing apparatus 10, a plurality of processes including processes 14a, 14b, and 14c have been activated. The plurality of processes are executable in parallel by using the plurality of processors included in the processor 11. For example, when a degree of parallelism of processes is prioritized, the processor 11a may execute the process 14a, the processor 11b may execute the process 14b, and the processor 11c may execute the process 14c such that the processes 14a, 14b, and 14c may be simultaneously executable. A virtual address space is allocated to each of the processes 14a, 14b, and 14c. An address space is divided into pages with fixed lengths. That is, for memory management, a virtual storage and paging method is employed.

The memory 12 stores data of a part of pages included in the address space allocated to the processes 14a, 14b, and 14c. The storage device 13 stores data of pages not stored in the memory 12. Swapping of pages may be made between the memory 12 and the storage device 13. When a process is being executed and pages to be used by the corresponding process are not present in the memory 12, a page fault occurs. Then, a page-out in which data of some of pages on the memory 12 is retreated to the storage device 13, and a page-in in which data of desired pages is loaded to the memory 12 are performed.

Meanwhile, pages of a process that is being stopped may not be arranged in the memory 12, and all pages of the process that is being stopped may be retreated to the storage device 13. When a certain process is switched from a running state to a stop state, a swap-out may be performed in which all pages of the corresponding process arranged in the memory 12 at that point in time are retreated to the storage device 13. When a certain process is switched from a stop state to a running state, a swap-in may be performed in which pages of the corresponding process which have been swapped out are restored to the memory 12.

The processor 11 performs the following process management so as to efficiently use the memory 12. The following process management may be executed by using any of the processors included in the processor 11, or may be executed by a process scheduler included in an OS.

The processor 11 acquires a working set size for each of the plurality of processes executable in parallel. The working set size indicates an amount of pages which have been used for the latest unit time. For example, the processor 11 acquires a working set size 15a corresponding to the process 14a, a working set size 15b corresponding to the process 14b, and a working set size 15c corresponding to the process 14c. The working set size for each of the plurality of processes may be acquired by, for example, a process management unit included in the OS.

The processor 11 calculates a total working set size obtained by adding up the working set sizes of the plurality of processes. For example, the processor 11 adds up the working set sizes 15a, 15b, and 15c corresponding to the processes 14a, 14b, and 14c. When the total working set size does not exceed a threshold value, the processor 11 allows all the processes to be simultaneously executed. Meanwhile, when the total working set size exceeds the threshold value, the processor 11 selects a part of processes, and stops the corresponding selected process for a predetermined time. The threshold value may be determined based on a storage capacity of the memory 12. For example, setting the threshold value to the storage capacity of the memory 12, or setting the threshold value to be 110% of the storage capacity of the memory 12 may be taken into consideration.

As described above, pages of a process that is being stopped may be retreated in the storage device 13 until the process is re-executed. For example, when the process 14c is selected as the process that is to be stopped, pages of the process 14c present in the memory 12 are retreated to the storage device 13. The number of processes executed in parallel may be smaller than the number of processors included in the processor 11.

The processor 11 may repeatedly perform the selecting of a process that is to be stopped at predetermined time intervals. The processor 11 may select a process to be stopped such that a total working set size of running processes does not exceed a threshold value. The processor 11 may select a process to be stopped such that a total working set size of running processes approaches a threshold value. The processor 11 may select a process to be stopped such that a working set size of a process to be swapped out may become small. The processor 11 may monitor a change of a working set size of each process, and thus preferentially stop a process with a reduced working set size. The processor 11 may select a process to be stopped such that a continuous stop time of a specific process does not become excessive.

According to the information processing apparatus 10 of the first embodiment, a working set size of each of a plurality of processes executable in parallel by using a plurality of processors is acquired, and a total working set size is calculated. When the total working set size exceeds a threshold value, a part of the processes is selected, and the corresponding selected process is stopped for a predetermined time.

When the number of simultaneously running processes is increased to the maximum according to the number of processors included in the information processing apparatus 10, a memory access may become inefficient due to a lack of a storage area of the memory 12. In particular, when the sum of working set sizes of running processes exceeds a predetermined level, an occurrence of slashing in which page-out and page-in are frequently repeated rapidly increases. In contrast, in the information processing apparatus 10 according to the first embodiment, when a storage area of the memory 12 is insufficient, the number of simultaneously running processes is reduced, thereby suppressing an occurrence of slashing. Thus, a memory access becomes efficient. Accordingly, it is possible to reduce a total execution time until all the plurality of processes executable in parallel are completed. When the storage area of the memory 12 is not insufficient, it is possible to increase the number of simultaneously running processes by using all processors, and thus flexibly change a degree of parallelism according to a change of working set sizes.

The information processing apparatus 10 according to the first embodiment is particularly useful for a batch processing such as a scientific technical calculation. In the batch processing, it is not required to communicate with a user in real time, and an intermediate state prior to outputting of a final result does not matter. In the batch processing, it is beneficial as long as an elapsed time from start to end is reduced. Thus, it becomes possible to improve an execution efficiency of processes by, for example, pausing during execution, or exchanging of execution orders.

Second Embodiment

Figure 2:
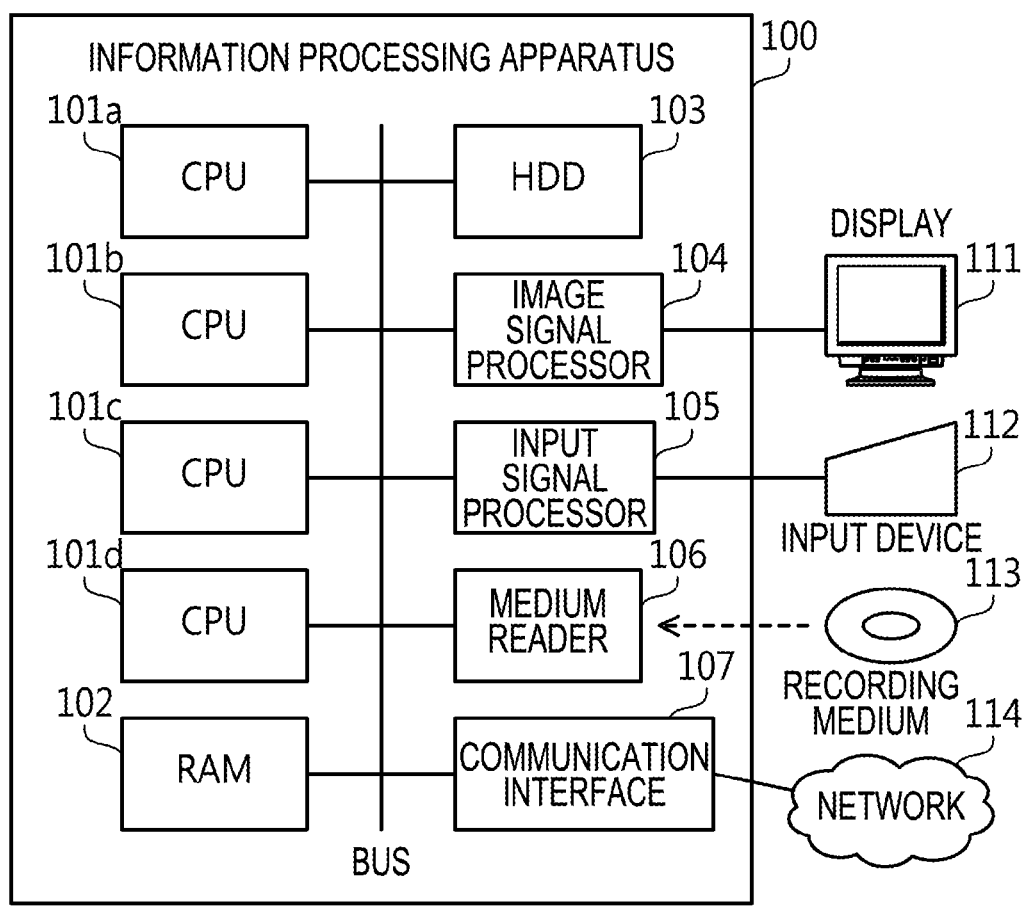
FIG. 2 is a view illustrating an example of hardware of an information processing apparatus according to a second embodiment.

Hereinafter, a second embodiment will be described. FIG. 2 is a view illustrating an example of hardware of an information processing apparatus according to the second embodiment.

An information processing apparatus 100 according to the second embodiment includes CPUs 101a, 101b, 101c, and 101d, a RAM 102, an HDD 103, an image signal processor 104, an input signal processor 105, a medium reader 106, and a communication interface 107. The CPUs 101a, 101b, and 101c correspond to the processors 11a, 11b, and 11c in the first embodiment. The RAM 102 corresponds to the memory 12 in the first embodiment. The HDD 103 corresponds to the storage device 13 in the first embodiment.

The CPUs 101a, 101b, 101c, and 101d are processors that execute commands of programs. The CPU 101 loads at least a part of programs or data stored in the HDD 103 into the RAM 102, and then executes the programs. The CPUs 101a, 101b, 101c, and 101d may execute a plurality of processes in parallel, which start from the same or different programs. When executing the plurality of processes in parallel, the CPUs 101a, 101b, 101c, and 101d share the RAM 102. The CPUs 101a, 101b, 101c, and 101d may be CPU cores in the same package.

The RAM 102 is a volatile semiconductor memory that temporarily stores programs to be executed by the CPUs 101a, 101b, 101c, and 101d, or data used for calculation by the CPUs 101a, 101b, 101c, and 101d. The information processing apparatus 100 may include a memory of a type other than the RAM, or include a plurality of memories.

The HDD 103 is a non-volatile storage device that stores programs of software such as an OS, or middleware or application software, and data. The information processing apparatus 100 may include other types of storage devices such as a flash memory or an SSD, or may include a plurality of non-volatile storage devices.

The image signal processor 104 outputs an image to a display 111 connected to the information processing apparatus 100. As for the display 111, for example, a cathode ray tube (CRT) display, a liquid crystal display (LCD), a plasma display, or an organic electro-luminescence (OEL) display may be used.

The input signal processor 105 accepts an input signal from an input device 112 connected to the information processing apparatus 100. As for the input device 112, for example, a mouse, a touch panel, a touch pad, a track ball, a keyboard, or a remote controller may be used. A plurality of types of input devices may be connected to the information processing apparatus 100.

The medium reader 106 is a reading device that reads programs or data recorded in a recording medium 113. As for the recording medium 113, for example, a magnetic disk, an optical disk, a magneto-optical (MO) disk, or a semiconductor memory may be used. The magnetic disk includes a flexible disk (FD) or an HDD. The optical disk includes a compact disc (CD) or a digital versatile disc (DVD). The medium reader 106 stores, for example, programs or data read from the recording medium 113, in another recording medium such as the RAM 102 or the HDD 103. The recording medium 113 may be a portable recording medium, and may be used for distributing programs or data. The recording medium 113 or the HDD 103 may be referred to as a computer-readable recording medium.

The communication interface 107 is an interface that communicates with another information processing apparatus through a network 114. The communication interface 107 may be a wired communication interface connected to a wired communication device such as a switch or a router, or a wireless communication interface connected to a wireless communication device such as a base station or an access point.

Meanwhile, the information processing apparatus 100 uses a virtual storage and paging method for management of a storage area of the RAM 102. A virtual address space is allocated to each of processes executable by the CPUs 101a, 101b, 101c, and 101d, and an address space of each process is divided into pages with fixed lengths. The sum of address spaces of a plurality of processes may exceed a storage capacity of the RAM 102. Some pages that may not be arranged in the RAM 102 serving as a main memory device are retreated to the HDD 103 serving as an auxiliary memory device.

Swapping of pages is properly performed between the RAM 102 and the HDD 103. For a process running in any of the CPUs, at least a part of pages is arranged in the RAM 102. When a page fault occurs in which pages to be used by the running process are not present in the RAM 102, a page-out is performed in which some of pages arranged in the RAM 102 are retreated to the HDD 103. Then, by using an empty area generated by the page-out, a page-in is performed in which desired pages are restored from the HDD 103 to the RAM 102.

For a process being stopped, all pages may be retreated to the HDD 103. For a process switching from a running state to a stop state, a swap-out is performed in which all pages arranged in the RAM 102 at that point in time are retreated to the HDD 103. Then, for a process switching from a stop state to a running state, a swap-in is performed in which pages which have been swapped out are restored from the HDD 103 to the RAM 102.

In swapping of pages, a working set of each process is taken into consideration. The working set is a set of pages which have been used by a corresponding process for the latest predetermined time. Hereinafter, a size of a working set may be referred to as a working set size, and a sum of working set sizes of a plurality of processes may be referred to as a total working set size. The working set sizes may be different for processes, and even for the same process, the working set size may change by lapse of time. For a running process, there is a locality in that the same pages are likely to be repeatedly used in the short term, and thus it is desirable that pages belonging to a working set remain in the RAM 102 without being subjected to page-out.

The information processing apparatus 100 continuously determines a process to be executed (an execution target process) and a process to be stopped (a swap target process) so as to suppress the page swapping between the RAM 102 and the HDD 103 and efficiently use the RAM 102.

Figure 3:
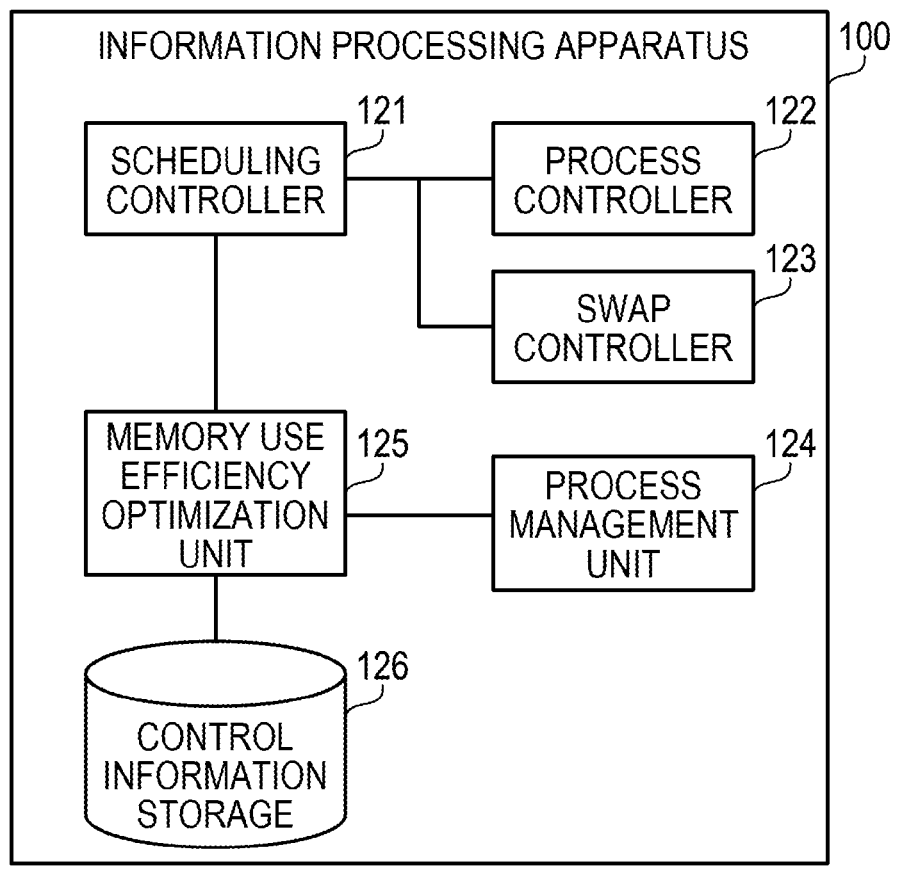
FIG. 3 is a block diagram illustrating an example of a function of the information processing apparatus.

FIG. 3 is a block diagram illustrating an example of a function of the information processing apparatus.

The information processing apparatus 100 includes a scheduling controller 121, a process controller 122, a swap controller 123, a process management unit 124, a memory use efficiency optimization unit 125, and a control information storage 126. The scheduling controller 121, the process controller 122, the swap controller 123, the process management unit 124, and the memory use efficiency optimization unit 125 are implemented by using, for example, program modules. The control information storage 126 is implemented by using, for example, a storage area of the RAM 102 or the HDD 103.

The scheduling controller 121, the process controller 122, the swap controller 123, the process management unit 124, and the memory use efficiency optimization unit 125 may be implemented as a scheduler within an OS. The scheduler within the OS is executed using, for example, a CPU as any one of the CPUs 101*a*, 101*b*, 101*c*, and 101*d*.

The scheduling controller 121 inquires of the memory use efficiency optimization unit 125 about a next swap target process at predetermined time intervals. The scheduling controller 121 specifies a currently running process and a currently stopped process, and specifies a next execution target process and a next swap target process based on the reply from the memory use efficiency optimization unit 125.

Then, the scheduling controller 121 specifies a process shifting from a running state to a stop state, and instructs the process controller 122 to stop the corresponding process, and instructs the swap controller 123 to swap out the corresponding process. The scheduling controller 121 specifies a process shifting from a stop state to a running state, and instructs the swap controller 123 to swap in the corresponding process, and instructs the process controller 122 to resume the corresponding process.

The process controller 122 switches processes to be executed by the CPUs 101*a*, 101*b*, 101*c*, and 101*d* according to an instruction from the scheduling controller 121. When instructed to stop a certain process, the process controller 122 retreats the execution information of the corresponding process on the RAM 102. The retreating of the execution information may include retreating of the register information such as a program counter within a CPU that executes the corresponding process on the RAM 102. When instructed to resume a certain process, the process controller 122 restores the execution information of the corresponding process on the RAM 102, and causes any of CPUs to execute the corresponding process. The restoring of the execution information may include loading the register information in the CPU by which the corresponding process is to be executed.

The swap controller 123 performs a swapping between the RAM 102 and the HDD 103 according to an instruction from the scheduling controller 121. When instructed to swap out a certain process, the swap controller 123 moves data of all pages corresponding to the corresponding process, among pages arranged in the RAM 102, to the HDD 103. When instructed to swap-in a certain process, the swap controller 123 reads data of the corresponding process retreated by swap-out, from the HDD 103, and restores the data to the RAM 102.

The process management unit 124 manages a state of a process that starts by the information processing apparatus 100 but has not yet ended. The process management unit 124 manages, for example, a process ID that identifies a process, a process state (a running state or a stop state), a swap time indicating a continuous stop time, and a working set. In response to the inquiry from the memory use efficiency optimization unit 125, the process management unit 124 provides a reply, that is, process information such as a process ID, a state, a swap time, and a working set size, to the memory use efficiency optimization unit 125.

Upon receiving an inquiry from the scheduling controller 121, the memory use efficiency optimization unit 125 acquires process information from the process management unit 124. Then, based on the acquired process information, the memory use efficiency optimization unit 125 determines a swap target process that is a process to be put in a stop state for the following predetermined time, and provides a reply, that is, the determined swap target process, to the scheduling controller 121. In the second embodiment, the memory use efficiency optimization unit 125 notifies the scheduling controller 121 of a swap target process, but may be allowed to notify the scheduling controller 121 of an execution target process.

The control information storage 126 stores control information used by the memory use efficiency optimization unit 125 in the process of determining a swap target process.

FIG. 4 is a view illustrating an example of a process information table in the second embodiment.

A process information table 127 is stored in the above described control information storage 126. The process information table 127 stores process information provided from the process management unit 124 to the memory use efficiency optimization unit 125. The process information table 127 includes items of a process ID, a state, a swap time, and a working set.

In the process ID item, a process identifier is registered. In the state item, "RUN" indicating a running state, or "SWAP" indicating a stop state is registered. In the swap time item, a time during which a process is continuously placed in a stop state (SWAP state) is registered. In the working set item, a working set size of a process is registered.

Next, a problem of process scheduling will be described.

Figure 5:
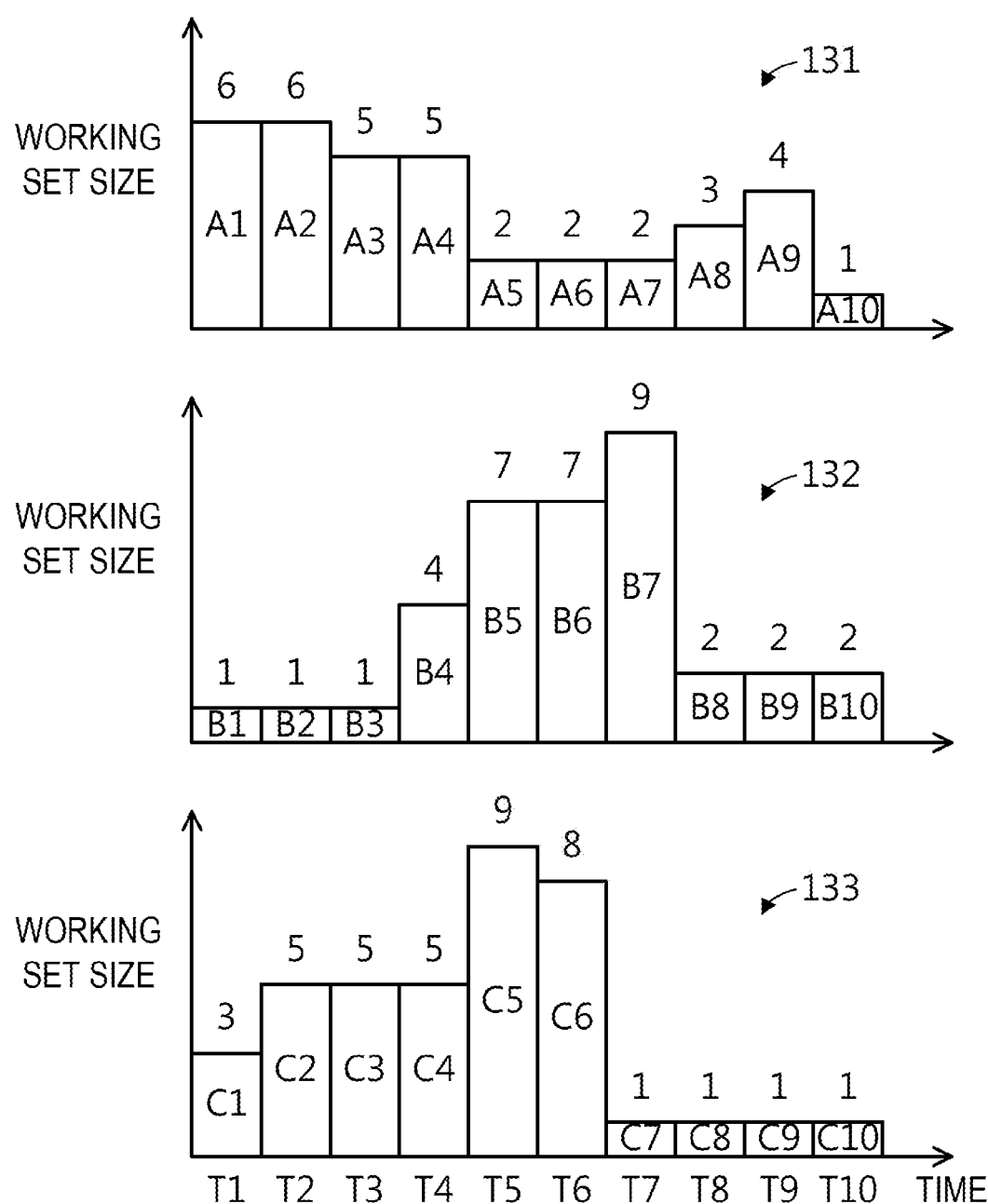
FIG. 5 is a view illustrating an example of a change of a working set size of each process.

FIG. 5 is a view illustrating an example of a change of a working set size of each process.

Here, a case is taken into consideration where three processes, that is, processes A, B, and C, have started simultaneously. When the CPUs 101*a*, 101*b*, and 101*c* are utilized, it is also possible to execute these three processes in parallel. For example, it is also possible that the CPU 101*a* executes the process A, the CPU 101*b* executes the process B, and the CPU 101c executes the process C. Meanwhile, the RAM 102 is shared by the three processes.

When each of the processes A, B, and C is independently executed, all the processes A, B, and C are completed after passing through periods T1 to T10 having predetermined time widths Δt. A period Ti indicates a period from time $(i-1) \times \Delta t$ to time $i \times \Delta t$. Hereinafter, a working set size for an $i^{th}$ period of the process A is represented by Ai, a working set size for an $i^{th}$ period of the process B is represented by Bi, and a working set size for an $i^{th}$ period of the process C is represented by Ci. A window size which is a unit time by which a working set is specified may be the same as or different from the time width Δt of the periods T1 to T10.

A graph 131 illustrates a change of a working set size of the process A in which A1=6 GiB, A2=6 GiB, A3=5 GiB, A4=5 GiB, A5=2 GiB, A6=2 GiB, A7=2 GiB, A8=3 GiB, A9=4 GiB, and A10=1 GiB.

A graph 132 illustrates a change of a working set size of the process B in which B1=1 GiB, B2=1 GiB, B3=1 GiB, B4=4 GiB, B5=7 GiB, B6=7 GiB, B7=9 GiB, B8=2 GiB, B9=2 GiB, and B10=2 GiB.

A graph 133 illustrates a change of a working set size of the process C in which C1=3 GiB, C2=5 GiB, C3=5 GiB, C4=5 GiB, C5=9 GiB, C6=8 GiB, C7=1 GiB, C8=1 GiB, C9=1 GiB, and C10=1 GiB. 1 GiB (gibibyte) corresponds to $1 \times 2^{30}$ bytes.

Figure 6:
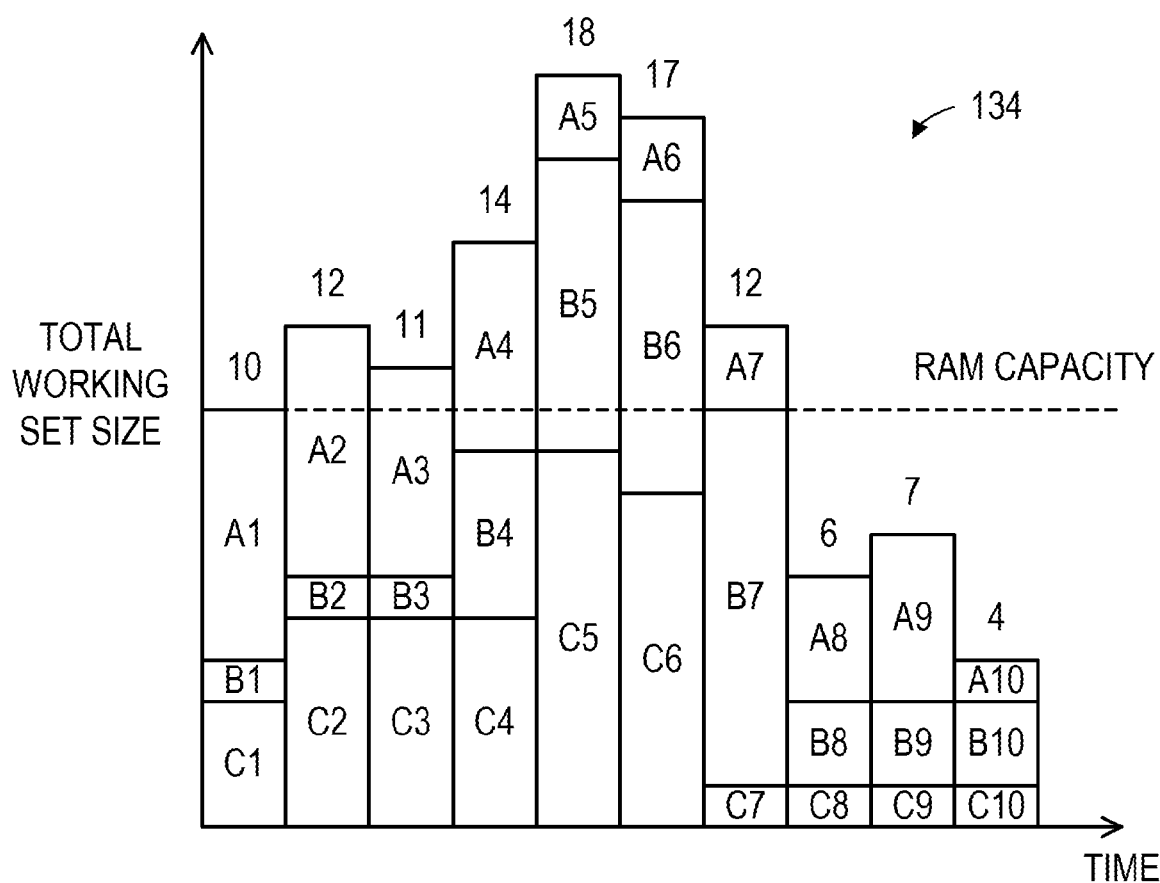
FIG. 6 is a view illustrating an example of a use of a RAM in a first parallel execution.

FIG. 6 is a view illustrating an example of a use of a RAM in a first parallel execution.

Here, a case is taken into consideration where the above described processes A, B, and C are simultaneously executed by using the CPUs 101a, 101b, and 101c. It is assumed that a physical storage capacity of the RAM 102 is 10 GiB. In this case, a total working set size obtained by adding up the working set sizes of the processes A, B, and C changes as illustrated in a graph 134.

The total working set size for the $1^{st}$ period is A1+B1+C1=10 GiB. The total working set size for the $2^{nd}$ period is A2+B2+C2=12 GiB. The total working set size for the $3^{rd}$ period is A3+B3+C3=11 GiB. The total working set size for the $4^{th}$ period is A4+B4+C4=14 GiB. The total working set size for the $5^{th}$ period is A5+B5+C5=18 GiB.

The total working set size for the $6^{th}$ period is A6+B6+C6=17 GiB. The total working set size for the $7^{th}$ period is A7+B7+C7=12 GiB. The total working set size for the $8^{th}$ period is A8+B8+C8=6 GiB. The total working set size for the $9^{th}$ period is A9+B9+C9=7 GiB. The total working set size for the $10^{th}$ period is A10+B10+C10=4 GiB.

As described above, from the $2^{nd}$ period to the $7^{th}$ period, the total working set size exceeds a physical storage capacity of the RAM 102. Thus, it is impossible to maintain all working sets of the processes A, B, and C in the RAM 102, and then an occurrence frequency of a page fault increases. Accordingly, a slashing occurs in which page-out and page-in are repeated, thereby increasing the access to the HDD 103. This decreases a substantial memory access speed.

In this case, even though the processes A, B, and C are simultaneously executed by using three CPUs, due to a delay of a memory access, a considerably long execution time becomes required as compared to an execution time 10×Δt in a case where each process is independently executed. That is, in the RAM 102 with a small storage capacity, when the number of simultaneously running processes is increased to the maximum, an execution time may become longer.

Figure 7:
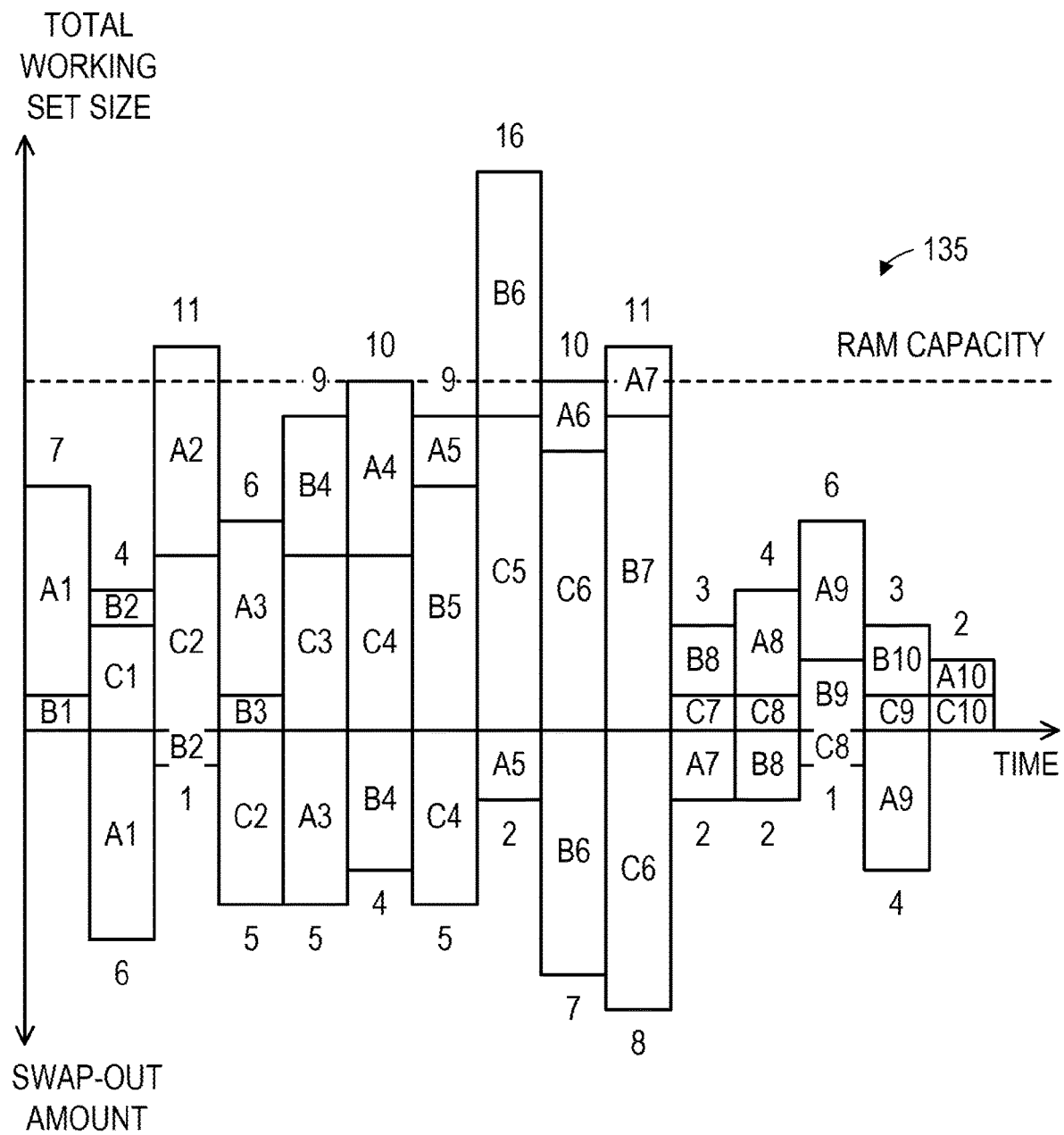
FIG. 7 is a view illustrating an example of a use of a RAM in a second parallel execution.

FIG. 7 is a view illustrating an example of a use of a RAM in a second parallel execution.

Here, a case is taken into consideration where one process of the processes A, B, and C is alternately stopped by a round robin method, and the number of simultaneously running processes is limited to two. For the $1^{st}$ period, the processes A and B are executed and the process C is stopped. For the $2^{nd}$ period, the processes B and C are executed and the process A is stopped. For the $3^{rd}$ period, the processes A and C are executed and the process B is stopped. Thereafter, this is repeated until all processes are completed. In this case, a total working set size changes as illustrated in a graph 135.

The total working set size for the $1^{st}$ period is A1+B1=7 GiB. The total working set size for the $2^{nd}$ period is B2+C1=4 GiB, and here, a swap-out amount is A1=6 GiB. The total working set size for the $3^{rd}$ period is A2+C2=11 GiB, and the swap-out amount is B2=1 GiB. The total working set size for the $4^{th}$ period is A3+B3=6 GiB, and the swap-out amount is C2=5 GiB. The total working set size for the $5^{th}$ period is B4+C3=9 GiB, and the swap-out amount is A3=5 GiB.

The total working set size for the $6^{th}$ period is A4+C4=10 GiB, and the swap-out amount is B4=4 GiB. The total working set size for the $7^{th}$ period is A5+B5=9 GiB, and the swap-out amount is C4=5 GiB. The total working set size for the $8^{th}$ period is B6+C5=16 GiB, and the swap-out amount is A5=2 GiB. The total working set size for the $9^{th}$ period is A6+C6=10 GiB, and the swap-out amount is B6=7 GiB. The total working set size for the $10^{th}$ period is A7+B7=11 GiB, and the swap-out amount is C6=8 GiB.

The total working set size for the $11^{th}$ period is B8+C7=3 GiB, and the swap-out amount is A7=2 GiB. The total working set size for the $12^{th}$ period is A8+C8=4 GiB, and the swap-out amount is B8=2 GiB. The total working set size for the $13^{th}$ period is A9+B9=6 GiB, and the swap-out amount is C8=1 GiB. The total working set size for the $14^{th}$ period is B10+C9=3 GiB, and the swap-out amount is A9=4 GiB. The total working set size for the $15^{th}$ period is A10+C10=2 GiB.

As described above, even when the number of simultaneously running processes is mechanically limited to two by a round robin method, the total working set size may greatly exceed a storage capacity of the RAM 102. Thus, the slashing may still occur. Meanwhile, even when the total working set size is significantly lower than the storage capacity of the RAM 102, the number of simultaneously running processes, remains as it is (i.e., two), and thus the empty area of the RAM 102 may increase. Since each process mechanically becomes a swap target process once every three times, the swap-out amount becomes large, thereby increasing an access to the HDD 103. This increases the load of swapping.

Therefore, the information processing apparatus 100 according to the second embodiment dynamically determines whether to stop a part of processes based on the latest working set size of each process. When stopping a part of processes, the information processing apparatus 100 selects a proper process as a swap target process so as to efficiently use the memory. In selecting the swap target process, for example, reducing an empty area of the RAM 102, reducing a swap-out amount, or not causing a process with an extremely long continuous stop time is taken into consideration.

Next, a processing procedure of the information processing apparatus 100 will be described.

Figure 8:
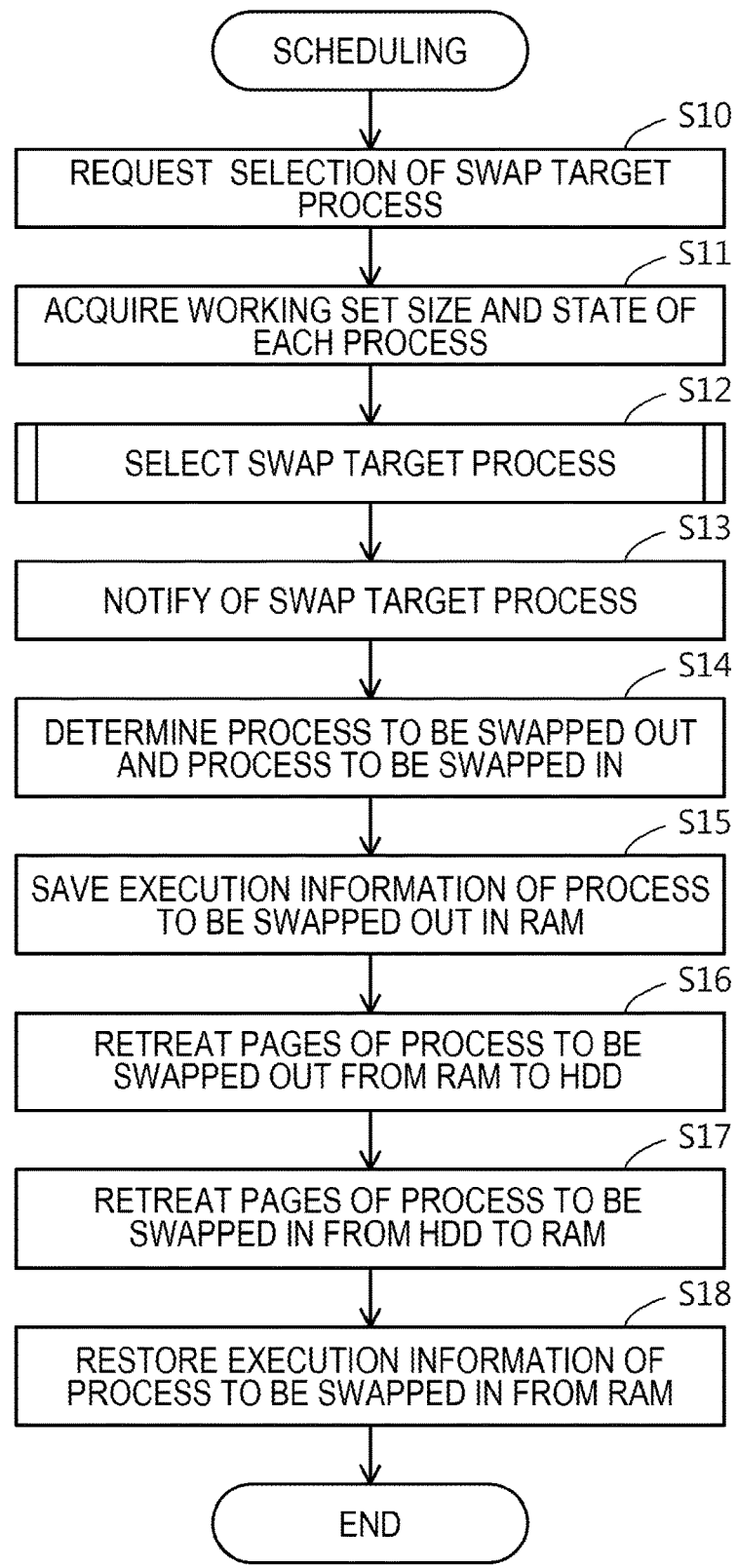
FIG. 8 is a flowchart illustrating an example of a scheduling procedure.

FIG. 8 is a flowchart illustrating an example of a scheduling procedure.

The following processing is repeatedly executed at a cycle of a predetermined time width Δt.

(S10) The scheduling controller 121 instructs the memory use efficiency optimization unit 125 to select a swap target process.

(S11) The memory use efficiency optimization unit 125 acquires a working set size and a state (RUN state or SWAP state) of each process that starts by the information processing apparatus 100 but has not yet ended, from the process management unit 124. The memory use efficiency optimization unit 125 acquires a swap time of each process from the process management unit 124. Meanwhile, the swap time may be acquired when the swap time is referenced later.

(S12) The memory use efficiency optimization unit 125 selects a swap target process based on information acquired in step S11. A process selecting procedure will be described below.

(S13) The memory use efficiency optimization unit 125 notifies the scheduling controller 121 of the swap target process selected in step S12. Meanwhile, the memory use efficiency optimization unit 125 may notify the scheduling controller 121 of an execution target process.

(S14) The scheduling controller 121 determines a process to be swapped out, that is, a process to be changed from a RUN state to a SWAP state, based on the notification in step S13. The scheduling controller 121 determines a process to be swapped in, that is, a process to be changed from a SWAP state to a RUN state.

(S15) The scheduling controller 121 notifies the process controller 122 of the process to be swapped out. The process controller 122 interrupts the process to be swapped out, and saves execution information indicating a situation at the time of interruption of the corresponding process, in the RAM 102. For example, the process controller 122 saves register information such as a program counter within a CPU that executes the corresponding process, in the RAM 102.

(S16) The scheduling controller 121 notifies the swap controller 123 of the process to be swapped out. The swap controller 123 searches for the pages corresponding to the process to be swapped out among the pages arranged in the RAM 102. The swap controller 123 retreats all the data of the retrieved pages to the HDD 103, and releases a storage area of the RAM 102 in which the retrieved pages were arranged.

(S17) The scheduling controller 121 notifies the swap controller 123 of the process to be swapped in. The swap controller 123 searches for the pages retreated at the time of swap-out of the corresponding process, from the HDD 103, as the pages corresponding to the process to be swapped in. The swap controller 123 reads data of the retrieved pages from the HDD 103 to an empty area of the RAM 102, and restores the retrieved pages to the RAM 102.

(S18) The scheduling controller 121 notifies the process controller 122 of the process to be swapped in. The process controller 122 selects a CPU that executes the process to be swapped in. The process controller 122 extracts execution information indicating a situation at the time of interruption of the corresponding process, from the RAM 102, and restores the extracted execution information so as to allow the selected CPU to resume execution of the corresponding process. For example, the process controller 122 loads register information such as a program counter, in the selected CPU.

Figure 9:
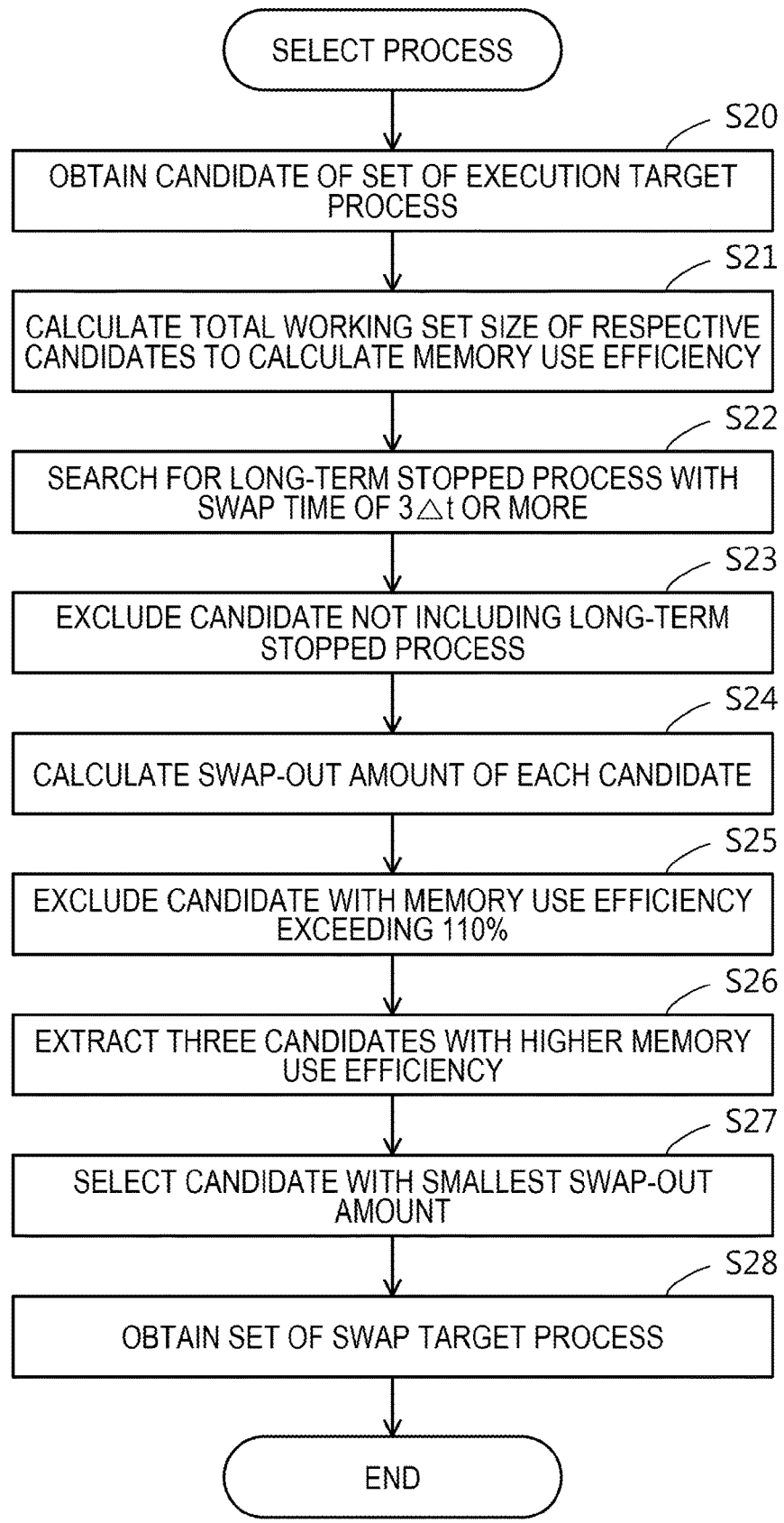
FIG. 9 is a flowchart illustrating an example of a process selecting procedure in the second embodiment.

FIG. 9 is a flowchart illustrating an example of a process selecting procedure in the second embodiment.

The following processing is executed in step S12 as described above.

(S20) The memory use efficiency optimization unit 125 obtains set candidates of execution target processes from a set of all processes. The obtained candidates correspond to the sets with respect to the set of all processes. For example, when processes A, B, and C are present, seven candidates {A}, {B}, {C}, {A, B}, {A, C}, {B, C}, and {A, B, C} are calculated.

(S21) For each of the candidates obtained in step S20, the memory use efficiency optimization unit 125 calculates a total working set size obtained by adding up working set sizes of execution target processes. Then, for each of the candidates, the memory use efficiency optimization unit 125 calculates "memory use efficiency" obtained by dividing the total working set size by a storage capacity of the RAM 102.

(S22) The memory use efficiency optimization unit 125 searches for a long-term stopped process with a swap time of $3 \times \Delta t$ or more, among all the processes. The long-term stopped process is a process that has been selected as a swap target process continuously for three or more periods.

(S23) The memory use efficiency optimization unit 125 causes the long-term stopped process retrieved in step S22 to be selected as an execution target process in the following period. That is, the memory use efficiency optimization unit 125 excludes candidates not including the long-term stopped process as an execution target process, among the candidates obtained in step S20. For example, when the process A is the long-term stopped process among the processes A, B, and C, the memory use efficiency optimization unit 125 narrows down candidates to four candidates {A}, {A, B}, {A, C}, and {A, B, C}.

(S24) For each of candidates obtained in step S20, the memory use efficiency optimization unit 125 specifies processes to be shifted from a RUN state to a SWAP state, and calculates the sum of working set sizes of the specified processes as a swap-out amount. The calculated swap-out amount is an expected value of an amount of data transmitted from the RAM 102 to the HDD 103 in swapping. In the second embodiment, as an index of an access load of the HDD 103, the swap-out amount is used, but a swap-in amount may be used, or a sum of the swap-out amount and the swap-in amount may be used.

(S25) The memory use efficiency optimization unit 125 excludes candidates whose memory use efficiency calculated in step S21 exceeds 110% among the candidates narrowed down in step S23. Accordingly, a candidate with a high possibility of an occurrence of slashing is excluded. As a threshold value of a memory use efficiency, other values such as 100% may be used, or the threshold value may be specified by a user.

(S26) The memory use efficiency optimization unit 125 sorts the candidates narrowed down in step S25 in descending order of a memory use efficiency, and extracts three candidates from a candidate with a higher memory use efficiency. The number of candidates to be extracted may be changed. When the number of candidates narrowed down in step S25 is small, all the candidates may be extracted. Otherwise, all the candidates each of which has a memory use efficiency exceeding a predetermined threshold value may be extracted.

(S27) The memory use efficiency optimization unit 125 selects a candidate whose swap-out amount calculated in step S24 is the smallest, among the candidates extracted in step S26.

(S28) The memory use efficiency optimization unit 125 obtains a set of swap target processes from the candidate selected in step S27. The set of the swap target processes corresponds to a complementary set with respect to a set of execution target processes indicated by the selected candidate.

Figure 10:
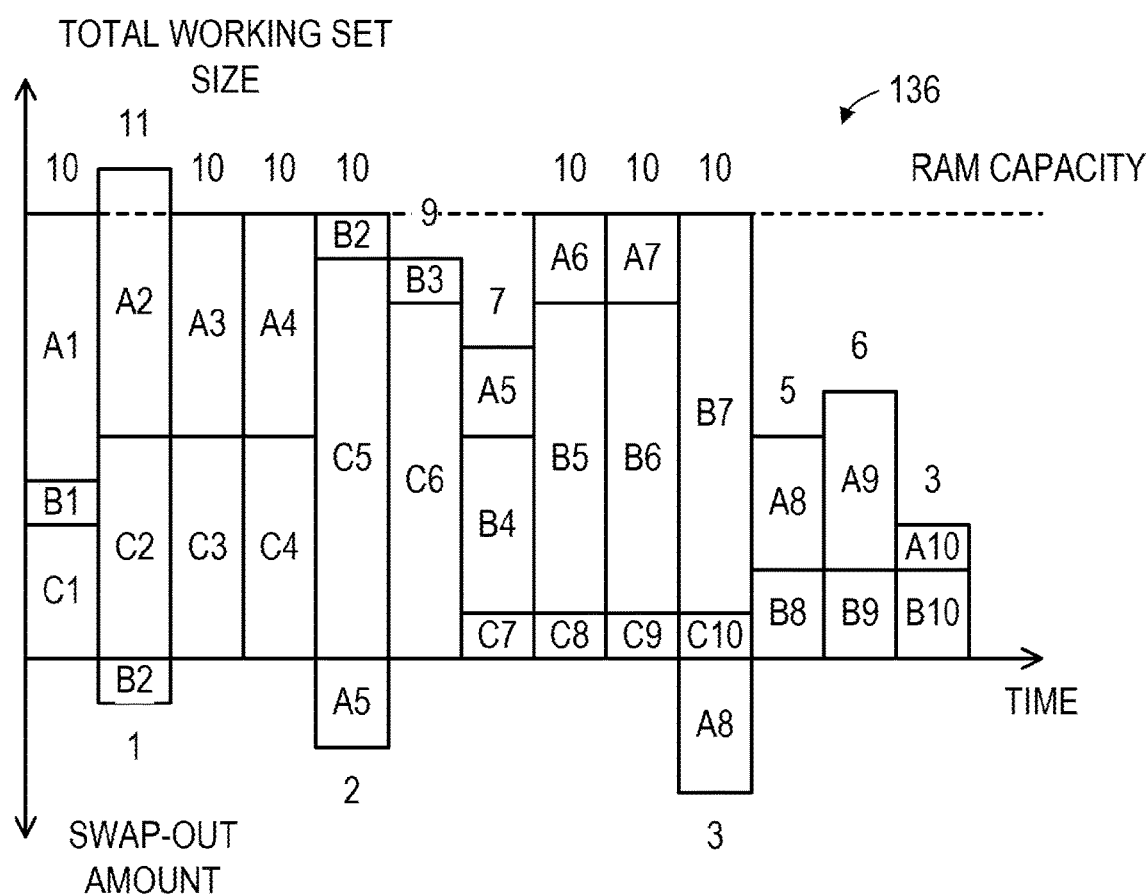
FIG. 10 is a view illustrating an example of a use of a RAM in a third parallel execution.

FIG. 10 is a view illustrating an example of a use of a RAM in a third parallel execution.

Here, a case is taken into consideration where the processes A, B, and C in FIG. 5 are scheduled according to the method in FIG. 9. In this case, a total working set size changes as illustrated in a graph 136.

The total working set size for the $1^{st}$ period is A1+B1+C1=10 GiB. The total working set size for the $2^{nd}$ period is A2+C2=11 GiB, and the swap-out amount is B2=1 GiB. The total working set size for the $3^{rd}$ period is A3+C3=10 GiB. The total working set size for the $4^{th}$ period is A4+C4=10 GiB. The total working set size for the $5^{th}$ period is B2+C5=10 GiB, and the swap-out amount is A5=2 GiB.

The total working set size for the $6^{th}$ period is B3+C6=9 GiB. The total working set size for the $7^{th}$ period is A5+B4+C7=7 GiB. The total working set size for the $8^{th}$ period is A6+B5+C8=10 GiB. The total working set size for the $9^{th}$ period is A7+B6+C9=10 GiB. The total working set size for the $10^{th}$ period is B7+C10=10 GiB, and the swap-out amount is A8=3 GiB. The total working set size for the $11^{th}$ period is A8+B8=5 GiB. The total working set size for the $12^{th}$ period is A9+B9=6 GiB. The total working set size for the $13^{th}$ period is A10+B10=3 GiB.

As described above, by making the number of simultaneously running processes variable according to working set sizes at each point in time, it is possible to suppress a total working set size from greatly exceeding a storage capacity of the RAM 102 and at the same time, to reduce an empty area of the RAM 102. If possible, the same process may be continuously executed, thereby decreasing a swap-out amount. At the same time, due to a small number of times of swapping, a process with an extremely long continuous stop time does not occur.

According to the information processing apparatus 100 of the second embodiment, the latest working set size of each process is acquired at a cycle of a time width Δt, and an execution target process and a stop target process are determined in the following time of Δt according to working set sizes.

Here, by suppressing a total working set size of execution target processes from exceeding a threshold value, it is possible to suppress a slashing and to improve the efficiency of a memory access. By increasing a total working set size of execution target processes within a range not exceeding a threshold value, it is possible to improve a resource usage rate, thereby reducing an execution time. By decreasing a swap-out amount, it is possible to suppress an access to the HDD 103, thereby reducing the overhead in page replacement. For a process with a long continuous stop time, by performing swap-in, it is possible to achieve fairness among a plurality of processes. In this manner, since an efficiency of a memory access is achieved, it is possible to reduce an execution time until all the plurality of processes are completed.

In the second embodiment, execution and stop are controlled on a per process basis, but may be controlled on a per job basis. A job is a processing unit larger than a process, and is a set including a series of processes which cooperatively operate to function as one application software. In this case, a case is taken into consideration where a job scheduler inside or outside an OS determines an execution target job and a swap target job based on working set sizes of processes included in each job.

Third Embodiment

Hereinafter, a third embodiment will be described. Descriptions will be made focusing differences from the second embodiment, and explanations on the same contents as those in the second embodiment may be omitted.

The third embodiment is different from the second embodiment in a method of selecting a swap target process. The process selecting method in the third embodiment is particularly useful for an information processing apparatus that performs a scientific technical calculation. The information processing apparatus according to the third embodiment may be implemented by the same module configuration as the information processing apparatus 100 according to the second embodiment as illustrated in FIGS. 2 and 3. Hereinafter, the third embodiment will be described using the same reference numerals as those in FIGS. 2 and 3.

Figure 11:
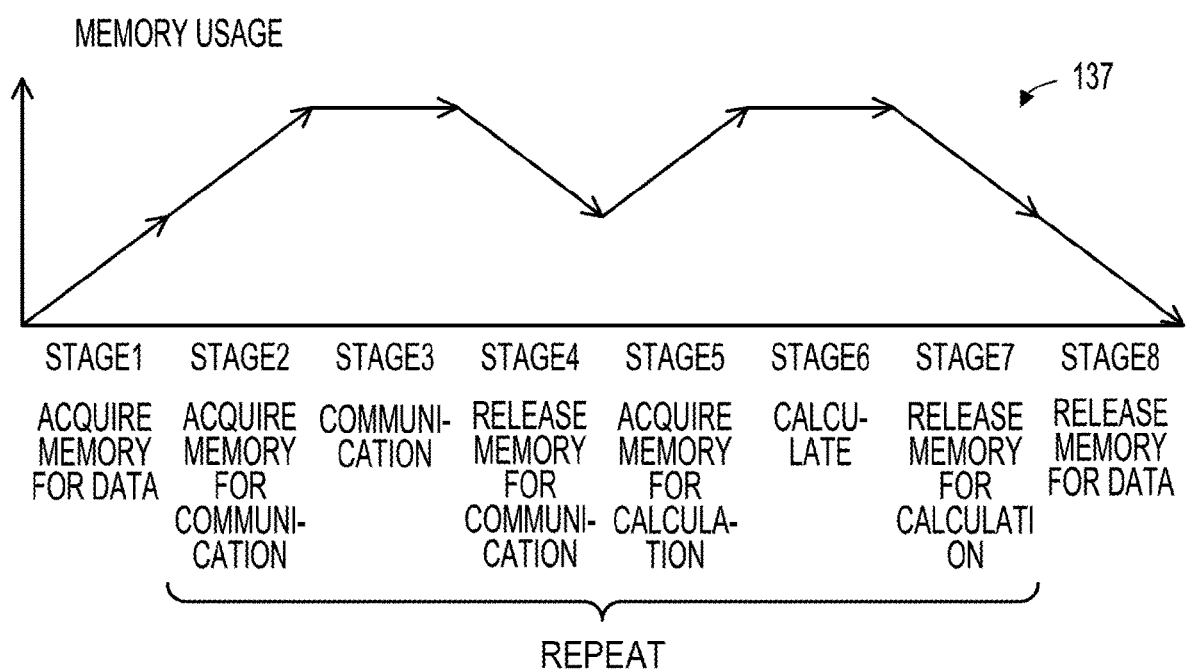
FIG. 11 is a view illustrating an example of a change in a RAM usage in a scientific technical calculation.

FIG. 11 is a view illustrating an example of a change in a RAM usage in a scientific technical calculation.

In the scientific technical calculation using a plurality of information processing apparatuses, in many cases, calculations are performed by a procedure as illustrated in FIG. 11. In stage 1, a memory area for holding data is acquired. In stage 2, a memory area for communication is acquired. In stage 3, communication is performed between information processing apparatuses. In stage 4, the memory area for communication acquired in stage 2 is released. In stage 5, a memory area for calculation is acquired. In stage 6, calculation is performed by using data received in stage 3 and the memory area for calculation acquired in stage 5. Stages 2 to 7 may be repeatedly executed twice or more times. That is, after stage 7, the procedure may return to stage 2 so that stages 2 to 7 may be executed again. In stage 7, the memory area for calculation acquired in stage 5 is released. In stage 8, the memory area for data acquired in stage 1 is released.

In this case, a memory usage changes as illustrated in a graph 137. In stage 1, a memory usage increases. In stage 2, the memory usage further increases. In stage 3, the memory usage does not change very much. In stage 4, the memory usage decreases. In stage 5, the memory usage increases again. In stage 6, the memory usage does not change very much. In stage 7, the memory usage decreases. In stage 8, the memory usage further decreases.

As illustrated in the graph 137, in the scientific technical calculation, the memory usage may largely decrease, and then largely increase again. That is, in a process of performing a scientific technical calculation, a working set size may largely decrease and then may largely increase again. Thus, it is desirable to perform swap-out of the process of performing the scientific technical calculation when a reduction amount of a working set size is large because a swap-out amount becomes smaller. In the third embodiment, such a characteristic of the scientific technical calculation is used.

FIG. 12 is a view illustrating an example of a process information table in the third embodiment.

A process information table 128 is stored in the control information storage 126. The process information table 128 is updated by the memory use efficiency optimization unit 125 based on process information provided from the process management unit 124 to the memory use efficiency optimization unit 125. The process information table 128 includes a process ID (a), a priority (b), a state (c), an execution count (d), a remaining scheduled count (e), a continuous execution count (f), a working set current value (g), a working set maximum value (h), a working set change amount (i), and an evaluation value (j).

In the process ID item, an identifier of a process is registered. In the priority item, a numerical value indicating a priority of the process is registered. The larger the numerical value, the higher the priority. In the state item, "RUN" indicating a running state or "SWAP" indicating a stop state is registered.

In the execution count item, the number of times selection as an execution target process is made is registered. The product of an execution count and a time width Δt indicates an execution time. In the remaining scheduled count item, the number of times the process is scheduled to be selected as an execution target process until the process is completed is registered. The product of a remaining scheduled count and a time width Δt indicates a remaining scheduled execution time. A scheduled execution time of each process is specified when a user inputs a job in the information processing apparatus 100. The memory use efficiency optimization unit 125 may calculate an initial value of the remaining scheduled count by dividing the specified scheduled execution time by a time width Δt. In the continuous execution count item, the number of times selection as an execution target process is continuously made is registered. The product of a continuous execution count and a time width Δt indicates a continuous execution time. When selection as a swap target process is made, the continuous execution count is initialized to 0.

In the working set current value item, the latest working set size is registered. In the working set maximum value item, the largest working set size among working set sizes after selection as an execution target process is made is registered. When selection as a swap target process is made, the working set maximum value is initialized to 0. In the working set change amount item, a change amount of a working set size since Δt hours ago, that is, a difference between the latest working set size and a working set size Δt hours ago is registered. When a working set size increases, the working set change amount becomes a positive value, and when the working set size decreases, the working set change amount becomes a negative value. When selection as a swap target process is made, the working set change amount is initialized to 0.

In the evaluation value item, a numerical value calculated by the method as described below is registered. The larger the evaluation value, the more preferable the process as a swap target process.

Figure 13:
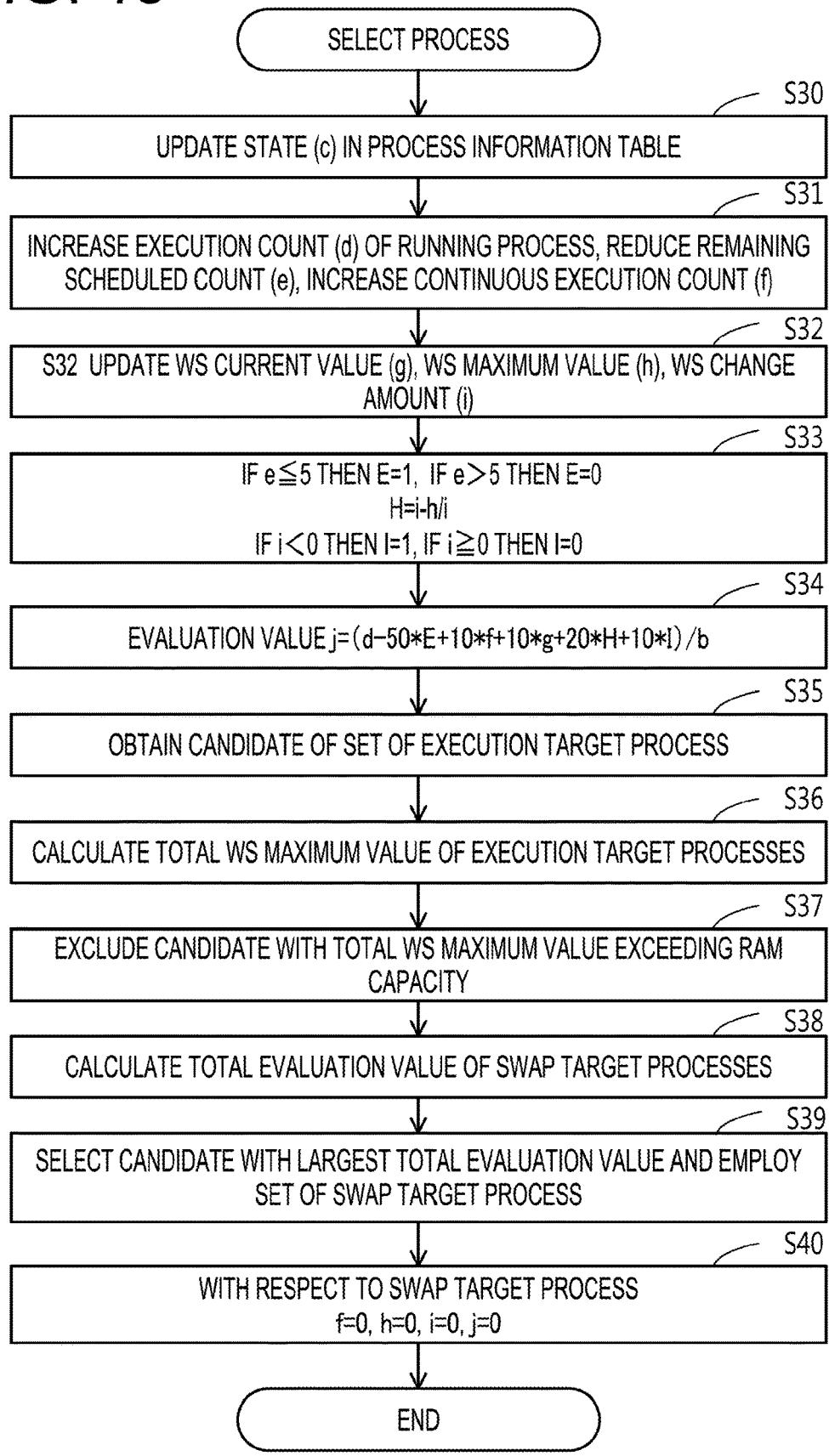
FIG. 13 is a flowchart illustrating an example of a process selecting procedure in the third embodiment.

FIG. 13 is a flowchart illustrating an example of a process selecting procedure in the third embodiment.

The following processing is executed in the above described step S12.

(S30) The memory use efficiency optimization unit 125 updates each process state (c) in the process information table 128 based on process information acquired from the process management unit 124.

(S31) For each of running processes in a "RUN" state, in the process information table 128, the memory use efficiency optimization unit 125 increases the execution count (d) by 1, decreases the remaining scheduled count (e) by 1, and increases the continuous execution count (f) by 1.

(S32) The memory use efficiency optimization unit 125 updates the working set current value (g), the working set maximum value (h), and the working set change amount (i) for each of processes in the process information table 128, based on process information acquired from the process management unit 124. The working set current value (g) is set as the latest working set size. The working set maximum value (h) is overwritten with the latest working set size when the latest working set size is larger than an existing value. The working set change amount (i) is set as a difference between the latest working set size and the working set current value (g) before updated.

(S33) The memory use efficiency optimization unit 125 calculates the values of parameters E, H, and I in the following manner. When the remaining scheduled count (e) is 5 or less, E is set to 1, and when the remaining scheduled count (e) is greater than 5, E is set to 0. The value of H is calculated as H=i−h/I by using the working set maximum value (h) and the working set change amount (i). When the working set change amount (i) is less than 0, I is set to 1, and when the working set change amount (i) is 0 or more, I is set to 0.

(S34) For each of the processes registered in the process information table 128, the memory use efficiency optimization unit 125 calculates the evaluation value (j) by using the priority (b), the execution count (d), the continuous execution count (f), the working set current value (g), and the parameters E, H, and I. It is assumed that j=(d−50×E+10×f+10×g+20×H+10×I)/b.

A process having a large value for the evaluation value (j) is likely to be selected as a swap target process. Here, as the priority (b) increases, the evaluation value (j) decreases, and thus, a process with a higher priority is likely to become an execution target process. As the execution count (d) increases, the evaluation value (j) increases, and thus, a process with a smaller execution count is likely to become an execution target process. As the value of the parameter E increases, the evaluation value (j) decreases, and thus, a process with a shorter remaining scheduled execution time is likely to become an execution target process. As the continuous execution count (f) increases, the evaluation value (j) increases, and thus, a process with a longer continuous execution time is likely to become a swap target process. As the values of the parameters H and I increase, the evaluation value (j) increases, and thus, a process with a largely reducing working set size is likely to become a swap target process.

(S35) The memory use efficiency optimization unit 125 obtains set candidates of execution target processes from a set of all processes. The obtained candidates correspond to sets with respect to the set of all processes. For example, when processes A, B, and C are present, seven candidates {A}, {B}, {C}, {A, B}, {A, C}, {B, C}, and {A, B, C} are calculated.

(S36) For each of the candidates obtained in step S35, the memory use efficiency optimization unit 125 calculates a total working set maximum value obtained by adding up working set maximum values (h).

(S37) The memory use efficiency optimization unit 125 excludes the candidates whose total working set maximum value calculated in step S36 exceeds a storage capacity of the RAM 102, among the candidates obtained in step S35. Accordingly, a candidate with a high possibility of an occurrence of slashing is excluded.

(S38) For each of candidates narrowed down in step S37, the memory use efficiency optimization unit 125 specifies swap target processes that correspond to a complementary set with respect to a set of execution target processes. Then, for each of the candidates, the memory use efficiency optimization unit 125 calculates a total evaluation value obtained by adding up evaluation values (j) of the swap target processes.

(S39) Among the candidates narrowed down in step S37, the memory use efficiency optimization unit 125 selects a candidate having the largest total evaluation value calculated in step S38. The memory use efficiency optimization unit 125 employs a set of swap target processes corresponding to the selected candidate.

(S40) In the process information table 128, the memory use efficiency optimization unit 125 initializes the continuous execution count (f), the working set maximum value (h), the working set change amount (i), and the evaluation value (j) of the swap target process, to 0.

According to the information processing apparatus of the third embodiment, the same effect as that in the second embodiment is achieved. Furthermore, in the third embodiment, by using a characteristic of a scientific technical calculation, it is possible to calculate a highly accurate evaluation value for each process. Accordingly, it is possible to properly select a swap target process so as to improve the efficiency of a memory access.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
   a processor including a plurality of sub-processors;
   a memory coupled to the processor and the memory configured to store data of part of pages included in an address space allocated to processes executable in parallel using the plurality of sub-processors; and
   a storage device coupled to the processor and the storage device configured to retreat data of pages that are not stored in the memory,
   the processor is configured to:
   acquire a working set size for each of the processes, the working set size indicating an amount of pages used for a unit time;
   select one or more of the processes when a sum of working set sizes of the processes exceeds a predetermined threshold value;
   stop the selected one or more of the processes for a predetermined time;
   control data of pages corresponding to the processes being stopped to be retreated from the memory to the storage device;
   execute the processes in parallel when the sum of working set sizes of the processes does not exceed the predetermined threshold value, and
   when the one or more of the processes are selected,
   calculate, for each of candidates of processes to be stopped, a usage size obtained by adding up working set sizes of the processes other than a relevant candidate of process to be stopped; and
   select a candidate among the candidates based on the usage size.

2. The information processing apparatus according to claim 1, wherein the processor is configured to:
   repeatedly executes the selection of processes to be stopped at intervals of the predetermined time;
   acquire a continuous stop time of each of the processes; and
   lower a selection priority of a process with the continuous stop time exceeding a predetermined reference value.

3. The information processing apparatus according to claim 1, wherein the processor is configured to increase a selection priority of a candidate larger in the usage size among the candidates, within a range in which the usage size does not exceed the predetermined threshold value.

4. The information processing apparatus according to claim 1, wherein the processor is configured to lower a selection priority of a running candidate with a larger working set size among candidates of processes to be stopped.

5. The information processing apparatus according to claim 1, wherein the processor is configured to:
   monitor a change in the working set sizes of the processes; and
   increase a selection priority of a candidate having a larger reduction amount of the working set size among candidates of processes to be stopped.

6. The information processing apparatus according to claim 1, wherein the predetermined threshold value is a storage capacity of the memory or a value determined depending on the storage capacity.

7. A process management method, comprising:
   acquiring, by a computer, a working set size for each of processes executable in parallel using a plurality of processors included in the computer, the working set size indicating an amount of pages used for a unit time among pages included in an address space allocated to the processes;
   selecting one or more of the processes when a sum of working set sizes of the processes exceeds a predetermined threshold value;
   stopping the selected one or more of the processes for a predetermined time;
   controlling data of pages corresponding to the processes being stopped to be retreated from a memory included in the computer to a storage device included in the computer;
   executing the processes in parallel when the sum of working set sizes of the processes does not exceed the predetermined threshold value,
   in the selecting, for each of candidates of processes to be stopped, a usage size obtained by adding up working set sizes of the processes other than a relevant candidate of process to be stopped is calculated; and
   a candidate is selected among the candidates based on the usage size.

8. The process management method according to claim 7, wherein a selection priority of the candidate larger in the usage size among the candidates is increased, within a range in which the usage size does not exceed the predetermined threshold value.

9. A non-transitory computer-readable recording medium having stored therein a program that causes a computer to execute a process, the process comprising:
   acquiring a working set size for each of processes executable in parallel using a plurality of processors included in the computer, the working set size indicating an amount of pages used for a unit time among pages included in an address space allocated to the processes;
   selecting one or more of the processes when a sum of working set sizes of the processes exceeds a predetermined threshold value;
   stopping the selected one or more of the processes for a predetermined time;
   controlling data of pages corresponding to the processes being stopped to be retreated from a memory included in the computer to a storage device included in the computer;

executing the processes in parallel when the sum of working set sizes of the processes does not exceed the predetermined threshold value, in the selecting, for each of candidates of processes to be stopped, a usage size obtained by adding up working set sizes of the processes other than a relevant candidate of process to be stopped is calculated; and a candidate is selected among the candidates based on the usage size.

10. The non-transitory computer-readable recording medium according to claim 9, wherein a selection priority of the candidate larger in the usage size among the candidates is increased, within a range in which the usage size does not exceed the predetermined threshold value.

* * * * *